US009485133B2

(12) United States Patent
Florez-Larrahondo et al.

(10) Patent No.: US 9,485,133 B2
(45) Date of Patent: Nov. 1, 2016

(54) PLATFORM INDEPENDENT MANAGEMENT CONTROLLER

(75) Inventors: German Florez-Larrahondo, Georgetown, TX (US); Jimmy D. Pike, Georgetown, TX (US); Joseph Andrew Vivio, Santa Rosa, CA (US); John Stuewe, Round Rock, TX (US); Joseph M. Sekel, Austin, TX (US); Richard Steven Mills, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 939 days.

(21) Appl. No.: 13/430,292

(22) Filed: Mar. 26, 2012

(65) Prior Publication Data

US 2013/0254566 A1 Sep. 26, 2013

(51) Int. Cl.
 *G06F 15/173* (2006.01)
 *G06F 1/26* (2006.01)
 *H04L 12/24* (2006.01)

(52) U.S. Cl.
 CPC .................................. *H04L 41/0226* (2013.01)

(58) Field of Classification Search
 CPC .................................................. H04L 41/0226
 See application file for complete search history.

(56) References Cited

U.S. PATENT DOCUMENTS

| | | | | |
|---|---|---|---|---|
| 2005/0267956 A1* | 12/2005 | Huang | | 709/223 |
| 2006/0031447 A1* | 2/2006 | Holt et al. | | 709/223 |
| 2006/0168189 A1 | 7/2006 | Huang | | |
| 2007/0086449 A1* | 4/2007 | Huang | | H04L 12/24 370/389 |
| 2007/0088816 A1* | 4/2007 | Hrustemovic | | G06F 11/3027 709/224 |
| 2008/0033972 A1* | 2/2008 | Yin | | H04L 41/0213 |
| 2009/0006522 A1* | 1/2009 | Kim et al. | | 709/201 |
| 2009/0077428 A1* | 3/2009 | Johnson | | 714/49 |
| 2010/0082730 A1 | 4/2010 | Fujimori | | |
| 2010/0125671 A1* | 5/2010 | Thubert | | G06F 15/16 709/230 |
| 2010/0191989 A1* | 7/2010 | Khatri et al. | | 713/310 |
| 2010/0325256 A1 | 12/2010 | Lin et al. | | |

FOREIGN PATENT DOCUMENTS

WO WO2007024458 A2 3/2007

OTHER PUBLICATIONS

Partial Search Report and Invitation to Pay Additional Fees dated Jun. 10, 2013, mailed in the corresponding PCT Application No. PCT/US2013/029023, 5 pages.

(Continued)

*Primary Examiner* — Dustin Nguyen
*Assistant Examiner* — Juan C Turriate Gastulo
(74) *Attorney, Agent, or Firm* — Terrile, Cannatti, Chambers & Holland, LLP; Robert W. Holland

(57) ABSTRACT

DCMI functionality is extended to platforms of a datacenter by integrating a management controller in each of plural platforms and interfacing the management controllers with a management server through a network. End users interface with platforms of the datacenter using DCMI protocol communications. The management server supports communication with management controllers by receiving DCMI messages and translating the DCMI messages to a text-based protocol for communications with the management controllers. In one embodiment, the management controllers push sensor information for their associated platforms to a sensor cache of the management server so that the management sensor references the cache to respond to DCMI requests for sensor information.

18 Claims, 3 Drawing Sheets

(56) References Cited

OTHER PUBLICATIONS

Ramachandran et al., "Whitepaper: Data Center Manageability Interface (DCMI) Specification", Aug. 1, 2008, pp. 1-11, http://www.intel.com/content/dam/www/public/us/en/documents/white-papers/data-center-manageability-interface-paper.pdf [retrieved on Jun. 18, 2013].

International Search Report and Written Opinion for PCT Application No. PCT/US2013/029023 mailed Aug. 27, 2013.

Written Opinion for PCT Application No. PCT/US2013/029023 mailed Oct. 1, 2014.

* cited by examiner

PLATFORM INDEPENDENT MANAGEMENT CONTROLLER

BACKGROUND OF THE INVENTION

1. Field of the Invention

The present invention relates in general to the field of information handling system management, and more particularly to a platform independent management controller.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system servers are often operated in data centers that provide reliable power and cooling resources generally needed for operating information handling systems. A data center typically includes plural racks, each of which support multiple information handling systems in a vertically or horizontally stacked configuration. Information technology specialists generally manage the operation of server information handling systems through network interfaces. In order to perform certain management functions, such as remote power-up and power-down, information technology specialists generally access server information handling systems through a management subsystem that operates independently from the server information handling system itself. For example, each server information handling system in a server rack might include a baseboard management controller (BMC) that interfaces with a rack chassis management controller (CMC) to manage network, power and cooling resources. A BMC is basically a small computer system within the server information handling system that provides a management interface for information technology specialists to perform remote management functions.

One management interface that supports communication of management information for server information handling systems is the Intelligent Platform Management interface (IPMI). Recently, the DataCenter Manageability interface (DCMI) has been introduced as a replacement for IPMI. DCMI provides a standard for managing and monitoring server information handling systems that seeks to simplify management functions and replace IPMI in large scale datacenters. DCMI provides a standardized interface with out-of-band capabilities for remote operations via a network, such as remote power-on and power-down through a local area network. Some difficulties do exist with the installation and use of DCMI in datacenters. One difficulty is that a DCMI deployment typically needs one of two specific platforms to operate: a server with a BMC; or a server with INTEL ME and DCMI firmware. The limited platforms available for supporting DCMI make DCMI difficult to include in large datacenters that use a wide variety of platforms. Information technology specialists typically want to include servers and infrastructure components that use a common protocol, which makes DCMI difficult to deploy where a datacenter has legacy systems that do not support DCMI, such as servers that do not include a BMC or specialized INTEL firmware. In addition, DCMI typically does not support management of cooling fans, power distribution units and power supply units in a chassis or rack used for shared infrastructure or storage chassis and similar systems that do not include a motherboard. DCMI generally lacks scalability and has management software poll sensor data from server information handling systems. Further, DCMI implementations tend to behave in different manners even where provided from a common vendor.

SUMMARY OF THE INVENTION

Therefore a need has arisen for a system and method which supports platform independent management of datacenter devices.

In accordance with the present invention, a system and method are provided which substantially reduce the disadvantages and problems associated with previous methods and systems for management of datacenter devices. A management controller interfaces with physical components of a datacenter platform and with a management server to perform management functions that are communicated in a first management protocol to the management server by responding to management commands sent in a second protocol from the management server.

More specifically, a datacenter has plural platforms that cooperate to process information. A primary management network, such as a DCMI-compliant management network, provides an interface for management of platforms, such as by performing management functions in response to messages sent in a primary management protocol. A secondary management network supports management of platforms in the datacenter that lack the ability to comply with functions commanded by the primary management network. The secondary management network presents platforms to the primary management network through a management server as though the platforms are part of the primary management network. The management server communicates through the secondary management network with a management controller of each managed platform by using a secondary management protocol, such as a text-based protocol. The management controllers push sensor information from managed platforms to the management server for storage in a sensor cache. Requests in the primary network protocol for sensor information, such as DCMI monitoring operations, are responded to by the management server by retrieving information from the sensor cache. Requests in the primary network protocol to command a function at a managed platform are translated by the management server to the secondary management protocol and sent through the secondary management network for performance by the management controllers, such as by issuing text-based commands from the management server to the management controller associated with the platform involved in the function.

The present invention provides a number of important technical advantages. One example of an important technical advantage is that a framework is provided for a datacenter environment that supports DCMI on information handling systems and infrastructure assets without requiring availability of a full-featured baseboard management controller or INTEL ME firmware. The framework for supporting DCMI is platform independent to work across systems operating over hardware and software of different manufacturers. The cost of control at each point in the framework is minimal and amortized over each physical component that uses the framework for management. Overall datacenter costs may decline if more expensive baseboard management controllers are replaced with less expensive management microcontrollers that extend DCMI to server information handling system and other deployed platforms. Splitting internal management protocols of a management network allows the use of pushes of sensor and other data from managed platforms instead of polling by a server. Pushing data from management platforms using binary encoding and a text-protocol for commands improves scalability, performance and robustness so that large-scale data center environments can be monitored and managed within a common framework.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

DCMI-based management of information handling systems and other platforms in a datacenter is provided with management controllers deployed to interface with a management server. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
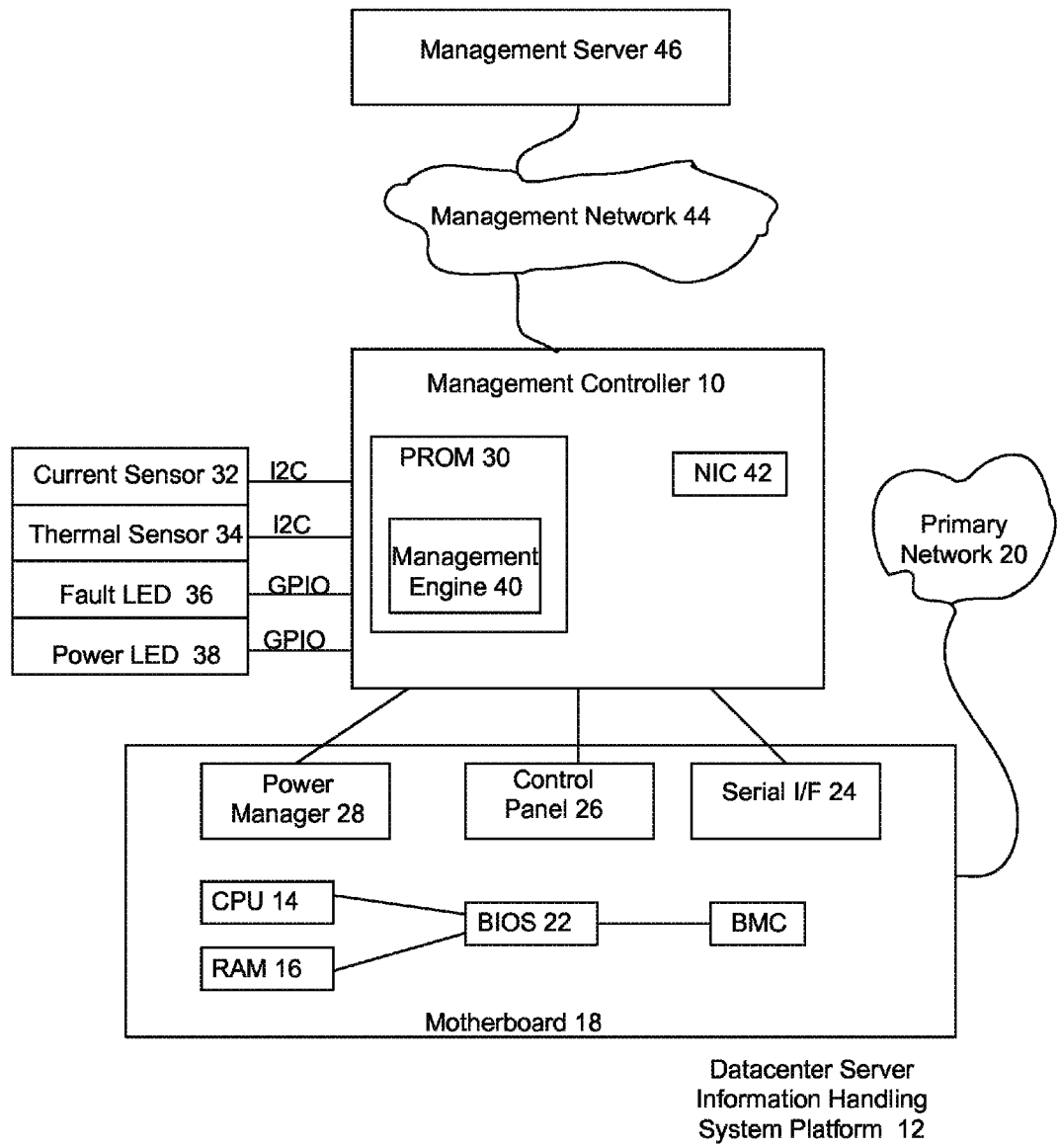
FIG. 1 depicts a block diagram of a management controller interfaced with a datacenter platform under management.

Referring now to FIG. 1, a block diagram depicts a management controller 10 interfaced with a datacenter platform 12 under management. In the example embodiment, datacenter platform 12 is an information handling system server that processes information with a processor 14 and memory 16 disposed on a motherboard 18, such as to support communications with clients through a primary network 20. A BIOS 22 or other firmware disposed on motherboard 18 manages physical components of motherboard 18, such as communications through a serial bus 24, responses to physical inputs at a control panel 26 and performing power control at a power manager 28 to power-up and power-down components interfaced with motherboard 18. In alternative embodiments, datacenter platform 12 can be any processing or infrastructure device deployed in a datacenter, including but not limited to power systems, cooling systems, storage systems, switches, routers, etc. . . . . Management controller 10 provides a platform independent microcontroller having a defined set of functions stored in a PROM 30 or similar memory that extends management functionality under the DCMI protocol to smart and dumb datacenter managed devices.

Management controller 10 interfaces with motherboard 18 to have access to serial bus 24, control panel 26 and power manager 28. In addition, management controller 10 obtains sensor information from sensors of the datacenter managed platform 12, such as current sensed by a current sensor 32, temperature sensed by a temperature sensor 34, status and fault indicators sensed by a status sensor 36 and a power state sensed by a power sensor 38. A management engine 40 stored in PROM 30 executes on processing resources of management controller 10 to perform management functions, such as by interacting with components on motherboard 18 or sensors 32-38. A network interface card (NIC) 42 on management controller 10 communicates through a management network 44 with a management server 46 regarding management functions. Management controller 10 is a platform-independent microcontroller that provides management functions defined by a primary management protocol used in a datacenter, such as management functions defined by DCMI. The defined set of management functions operate with minimal processing capabilities so that management controller 10 provides a less complex and less expensive interface than a conventional baseboard management controller. Management controller 10 exercises control over a defined set of functions by connecting to and interfacing with power and control lines of motherboard 18.

In operation, management controller 10 communicates with management server 46 with a text-based management protocol. For example, management server 46 issues a text-based command through a TCP connection to change the power state of managed platform 12, such as with a power-up or power-down command. Management controller 10 receives the text-based command and issues the command to the appropriate motherboard 18 interface, such as by commanding an appropriate power state change at power manager 28. Management controller 10 communicates the execution of a command or the result of a command with a text-based response to management server 46. Management engine 40 executing on management controller 10 includes logic to retrieve sensor information from sensors 32-38 and push the sensor information through management network 44 to management server 46, such as by periodically reading the sensor information and pushing the sensor information using XDR/UDP. Sensor information is pushed as rapidly as reasonably possible based upon the availability of bandwidth on management network 44 to provide frequent monitoring. For example, rather than have management server 46 poll for current and temperature information from a managed platform 12, current and temperature information is pushed without a request from management server 46 so that up-to-date sensor information is readily available when needed. In most normal operating conditions, communication of sensor information will be the most common operation performed across management network 44 since management commands from management server 46 are typically performed infrequently once platforms are deployed in the datacenter.

Figure 2:
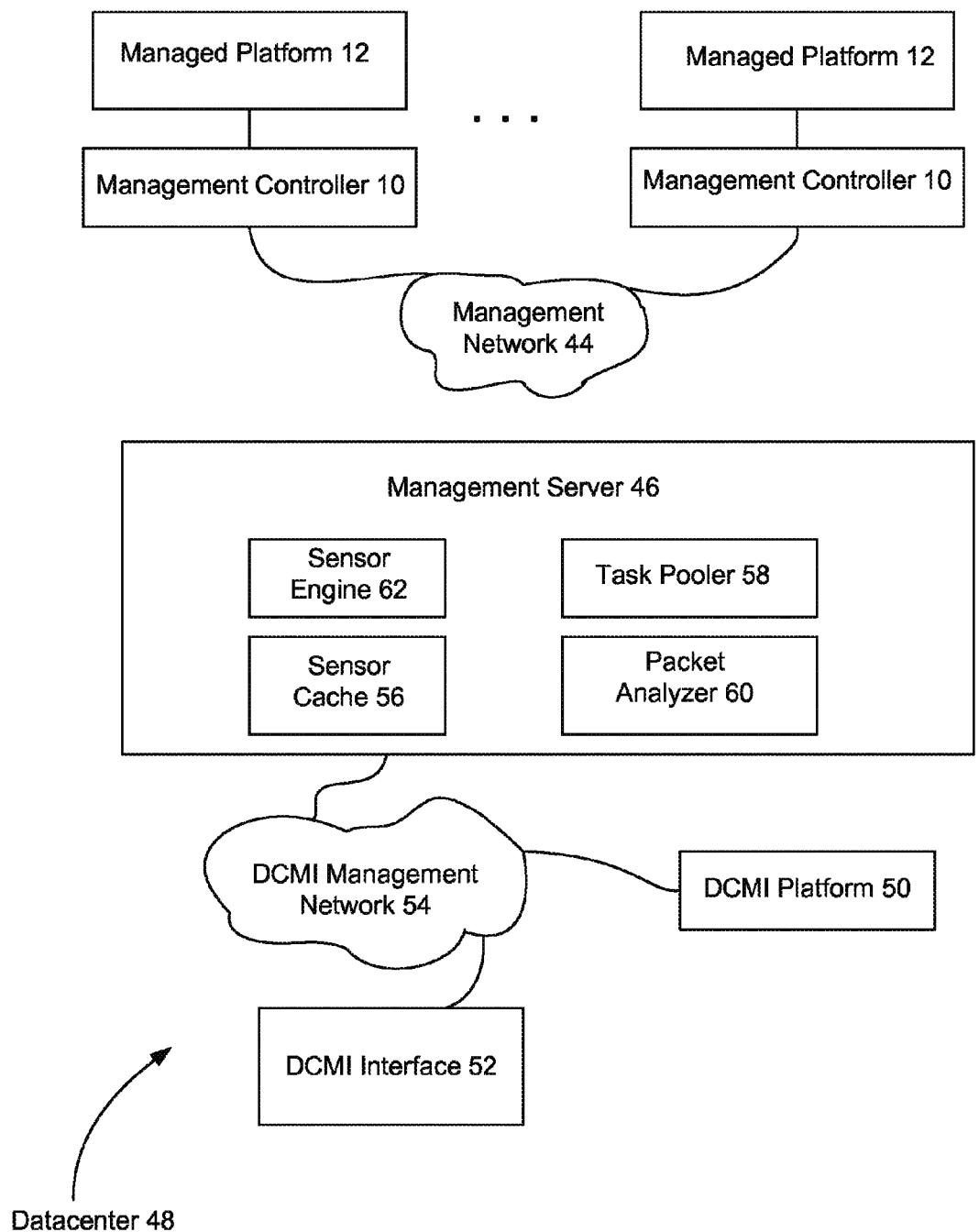
FIG. 2 depicts a block diagram of a datacenter managed by plural management controllers interfaced with a management server.

Referring now to FIG. 2, a block diagram depicts a datacenter 48 managed by plural management controllers 10 interfaced with a management server 46. Each of plural management controllers 10 interface with physical components of a managed datacenter platform 12 to provide one or more functions supported by DCMI, such as remote changes to a power state with a power-up or power-down and remote sensor reads. Managed datacenter platforms 12 include an array of processing and infrastructure resources that range for server information handling systems, rack and/or chassis managers, baseboard management controllers, fans, power supplies, storage devices, switches, etc. . . . . An end user communicates with management server 46 and DCMI platforms 50 through a DCMI interface 52 and a DCMI network 54. For example, a server information handling system having a baseboard management controller that supports DCMI communications is managed as a DCMI platform 50 with DCMI interface 52 through DCMI network 54 to provide remote power-up and power-down through DCMI commands issued to the baseboard management controller; However, the baseboard management controller itself includes a management controller 10 to allow remote power-up and power-down of the baseboard management controller as a DCMI managed device presented through management server 46. Management server 46 presents datacenter platforms 12 managed by a management controller 10 to DCMI interface 52 as though the datacenter platforms are directly controlled with DCMI commands, however, management server 46 intercedes between DCMI interface 52 and management controllers 10 to translate predetermined DCMI messages from the DCMI protocol to a text-based protocol used by management network 44 and to satisfy predetermined DCMI commands, such as by responding to requests for sensor information with locally stored sensor information previously-pushed from management controllers.

Management server 46 receives DCMI messages from DCMI interface 52 sent through DCMI network 54 and satisfies requests of the DCMI messages by either retrieving information stored in a local cache 56 or by issuing commands through a task pooler 58 to a management controller 10 associated with the message. A packet analyzer receives DCMI messages and maps incoming DCMI messages to a management server 46 associated with each DCMI message. For example, management server 46 virtualizes its IP address to provide a different RCMP+ port to each management controller 10 so that a given address or port is associated with a given management controller 10. Once the management controller associated with a DCMI message is identified, packet analyzer 60 opens and inspects the RCMP+ packet to translate the DCMI function of the DCMI message from the DCMI protocol to a locally-defined function, such as a request to read sensor information or a text-based command to issue from task pooler 58.

DCMI messages to management server 46 for reads of sensor information are handled locally by a sensor engine 62, which stores sensor information in sensor cache 56. For example, sensor engine 62 receives sensor information pushed from management controllers 10 and stores the sensor information in sensor cache 56 in association with an identifier for the management controller 10 that pushed the sensor information to management server 46. When a DCMI message requests sensor information for a platform device, such as the current or temperature sensed at a server information handling system associated with a management controller 10, sensor engine responds to the request by reading the sensor information from sensor cache 56. Sensor cache 56 is retained locally in memory of management server 46 if sufficient memory resources are available or may be retained at a separate storage resource. Sensor cache 56 provides timely responses to requests to DCMI monitoring operations without requiring polling of managed platforms 12. In an alternative embodiment, DCMI monitoring operations may also be supported by polling of managed platforms in some instances, such as where sensor information stored in sensor cache 56 has become stale.

DCMI messages to command a function at a managed platform 12 are translated by packet analyzer 60 from the DCMI protocol to a text-based or other management protocol used for communication with management controllers 10 and sent to task pooler 58 for execution. Task pooler 58 spawns tasks that send commands to a management controller associated with a function commanded by a DCMI message. The function is sent with a text-based command to the appropriate management controller 10 through management network 44. Management network 44 is maintained separate from DCMI management network 54 and inaccessible by an end user. To the end user, DCMI commands are issued and executed by DCMI messages to DCMI controlled managed datacenter platforms, with the use of a second management network and management controller invisible to the end user.

Figure 3:
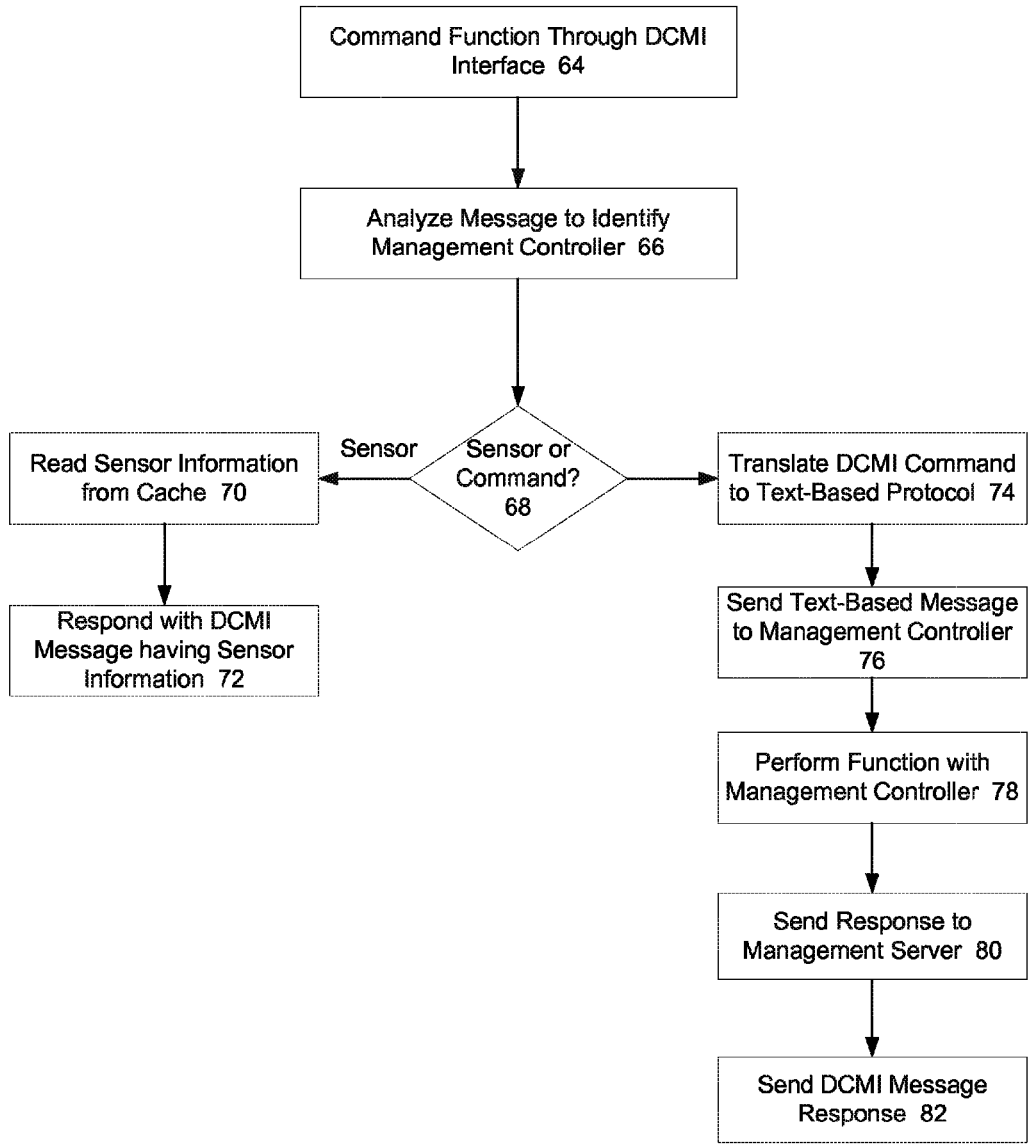
FIG. 3 depicts a flow diagram of a process for managing communications with datacenter platforms through first and second management protocols.

Referring now to FIG. 3, a flow diagram depicts a process for managing communications with datacenter platforms through first and second management protocols. The process begins at step 64 with a command to a DCMI-based interface sent as a DCMI-compliant message to a management server that manages management controllers for plural datacenter platforms. For example, the DCMI-compliant message requests sensor information as part of a monitoring function or requests performance of a function at a datacenter platform. At step 66, the DCMI-compliant message is received at the management server and analyzed to identify a management controller associated with the DCMI-compliant message. At step 68, the DCMI-compliant message is analyzed to determine if it requests a monitoring function or a command function. If a monitoring function is requested, the process continues to step 70 to read sensor information for the manage ent controller associated with the DCMI-compliant message from a cache of the management server. At step 72, the process completes by responding with a DCMI message sent from the management server having the sensor information.

If at step 68 the DCMI-compliant message is determined to include a function to command at a managed platform, the process continues to step 74 where the DCMI command is translated to a text-based command for communication through the management network. At step 76, the text-based command to perform the function of the DCMI message is communicated to the management controller associated with platform that is to perform the DCMI function. At step 78, the function is performed by the management controller interacting with the platform as directed by the text-based command. At step 80, in response to completing the function, a text-based message is communicated to the management server from the management controller. At step 82, the management server responds to the DCMI-compliant message with a responsive DCMI-compliant message indicating completion of the function. Although the process of FIG. 3 is set forth with DCMI and text based management protocols, other types of management protocols may be used to communicate functions to the management server and for translation to communicate the functions from the management server to the management controllers.

Although the present invention has been described in detail, it should be understood that various changes, substitutions and alterations can be made hereto without departing from the spirit and scope of the invention as defined by the appended claims.

What is claimed is:

1. A method for managing plural platforms disposed in a datacenter, the method comprising:
   communicating DCMI messages from an end user through a DCMI interface and management network directly to DCMI platforms;
   communicating DCMI messages from DCMI platforms through the management network a directly to the DCMI interface;
   communicating a first DCMI message from an end user through the DCMI interface to a management server with a DCMI management protocol;
   analyzing the first DCMI management message at the management server to identify one of plural management controllers associated with the first DCMI management message;
   opening the first DCMI management message at the management server to translate the first DCMI management message from the DCMI management protocol to determine a function associated with the first DCMI management message;
   sending the function from the management server to the identified management controller in a second management protocol; and
   performing the function at the identified management controller in response to the sending;
   wherein the management controller comprises a platform independent microcontroller having management functions stored in persistent memory and initiated by text commands sent by TCP to a network interface card coupled with the management controller; and
   wherein the message function comprises a selected function from plural functions, the plural functions including at least a first function that polls sensor information from a managed platform and a second function that commands the managed platform to push sensor data with plural pushed messages, the pushed messages initiated without a command from the management server, the pushed messages stored in cache of the management server and forwarded to the DCMI interface in response to requests for sensor data.

2. The method of claim 1 wherein performing the function comprises performing a change of power state of a platform managed by the management controller.

3. The method of claim 2 wherein the platform having a change of power state is a server information handling system.

4. The method of claim 2 wherein the platform having a change of power state is a baseboard management controller.

5. The method of claim 2 wherein the platform having a change of power state is a shared infrastructure platform.

6. The method of claim 1 further comprising:
   caching sensor information from the pushed messages at the management server;
   communicating a second DCMI management message from the end user to the management server with the DCMI management protocol;
   analyzing the second DCMI management message at the management server to identify one of plural management controllers associated with the second management message;
   opening the second DCMI management message at the management server to translate the second DCMI management message from the first management protocol to determine a request for sensor information associated with the second DCMI management message;
   retrieving the requested sensor information from the cache of the management server; and
   responding to the second DCMI management message with the sensor information from the cache by sending a response message with the DCMI management protocol without polling the management controller associated with the second DCMI management message.

7. The method of claim 6 further comprising:
   pushing sensor information from plural management controllers to the management server with the second management protocol; and
   storing the sensor information in the cache.

8. The method of claim 7 wherein the sensor information comprises a temperature sensed at a platform associated with the identified management controller.

9. The method of claim 7 wherein the sensor information comprises a current sensed at a platform associated with the identified management controller.

10. A system for managing plural platforms disposed in a datacenter, the plural platforms including plural DCMI platforms having DCMI management controllers and plural legacy platforms having legacy management controllers, the system comprising:
    a management server having a processor and memory;
    a DCMI interface in communication with the management server, the DCMI interface operable to establish communication directly with the DCMI platforms, the DCMI interface operable to establish communications with the legacy platforms through the management server;
    a packet analyzer stored in the management server memory and operable to execute on the processor to analyze messages received at the management server in a DCMI management protocol to determine a legacy management controller of plural legacy management controllers associated with each of the messages and to determine a function of each of the messages;
    a task pooler stored in the memory and operable to execute on the processor to interface with the packet analyzer and receive at least some of the functions, the task pooler further operable to translate the at least some of the functions to a second management protocol and to send the at least some of the functions in the second management protocol to associated legacy management controllers for commanding the at least some of the functions; and
    plural legacy management controllers, each legacy management controller coupled to a server information handling system platform and having functions stored in persistent memory, each function associated with a text command, the legacy management controllers performing functions in response to the text command sent from the management server by a TCP message;

wherein the functions comprise at least a first function that polls sensor data by the management server from the legacy management controllers and a second function that commands the legacy management controllers to push sensor data periodically to the management server without additional commands from the management server, the management server caching the pushed sensor data and sending the cached sensor data to the DCMI interface in response to requests for pulled sensor data.

11. The system of claim 10 further comprising:
- a sensor cache defined in the memory and operable to store sensor information in association with each of plural legacy management controllers; and
- a sensor engine stored in the memory and operable to execute on the processor, the sensor engine operable to receive sensor information pushed from the plural legacy management controllers and to store the sensor information in the sensor cache.

12. The system of claim 11 wherein at least some of the functions comprise reading sensor information of a server information handling system platform, the packet analyzer further operable to respond to functions for reading sensor information by retrieving sensor information from the cache for the legacy management controller associated with the server information handling system platform.

13. The system of claim 12 wherein the sensor information comprises a temperature of the server information handling system platform.

14. The system of claim 13 wherein the server information handling system platform comprises a power supply that provides power to plural server information handling system platforms.

15. The system of claim 12 wherein the sensor information comprises a current sensed at the server information handling system platform.

16. The system of claim 10 further comprising plural legacy management controllers, each legacy management controller interfaced with a server information handling system platform and operable to perform a function at the server information handling system platform, each management controller communicating with the management server using the second management protocol.

17. The system of claim 16 wherein at least some of the legacy management controllers are further operable to obtain a condition sensed at the server information handling system platform interfaced with the legacy management controller and to push the condition to the management server.

18. The system of claim 16 wherein the function comprises a power state change at a server information handling system platform and wherein the task pooler is further operable to communicate the power state change to the management controller associated with the platform in the second management protocol.

* * * * *